O. H. CLOUGH.
ANIMAL FEEDING DEVICE.
APPLICATION FILED JAN. 18, 1915.
1,167,385.
Patented Jan. 11, 1916.
2 SHEETS—SHEET 1.
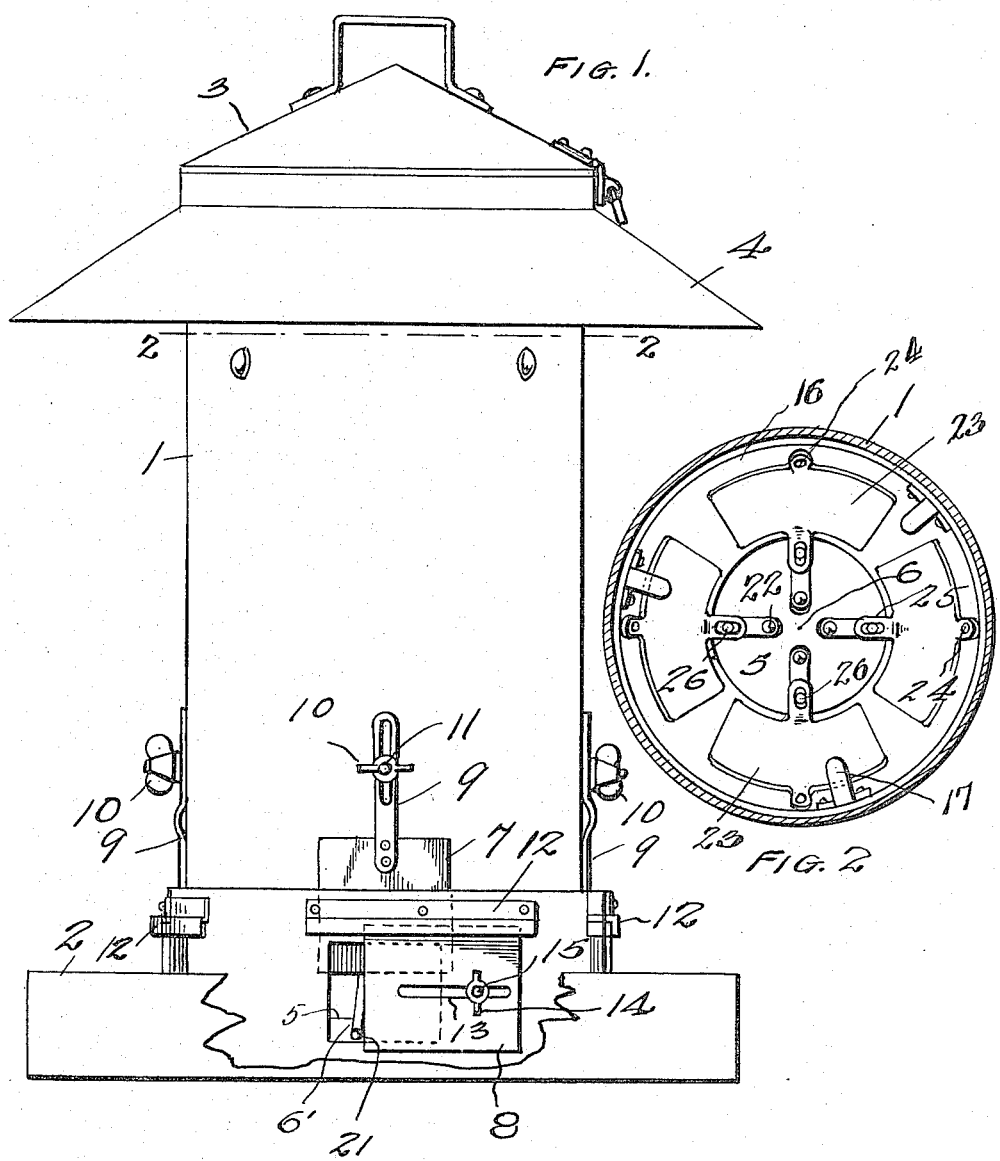
Witnesses
C. K. Davils.
M. L. Newcomt
O. H. Clough Inventor
By Herman A. Phillip
Attorney

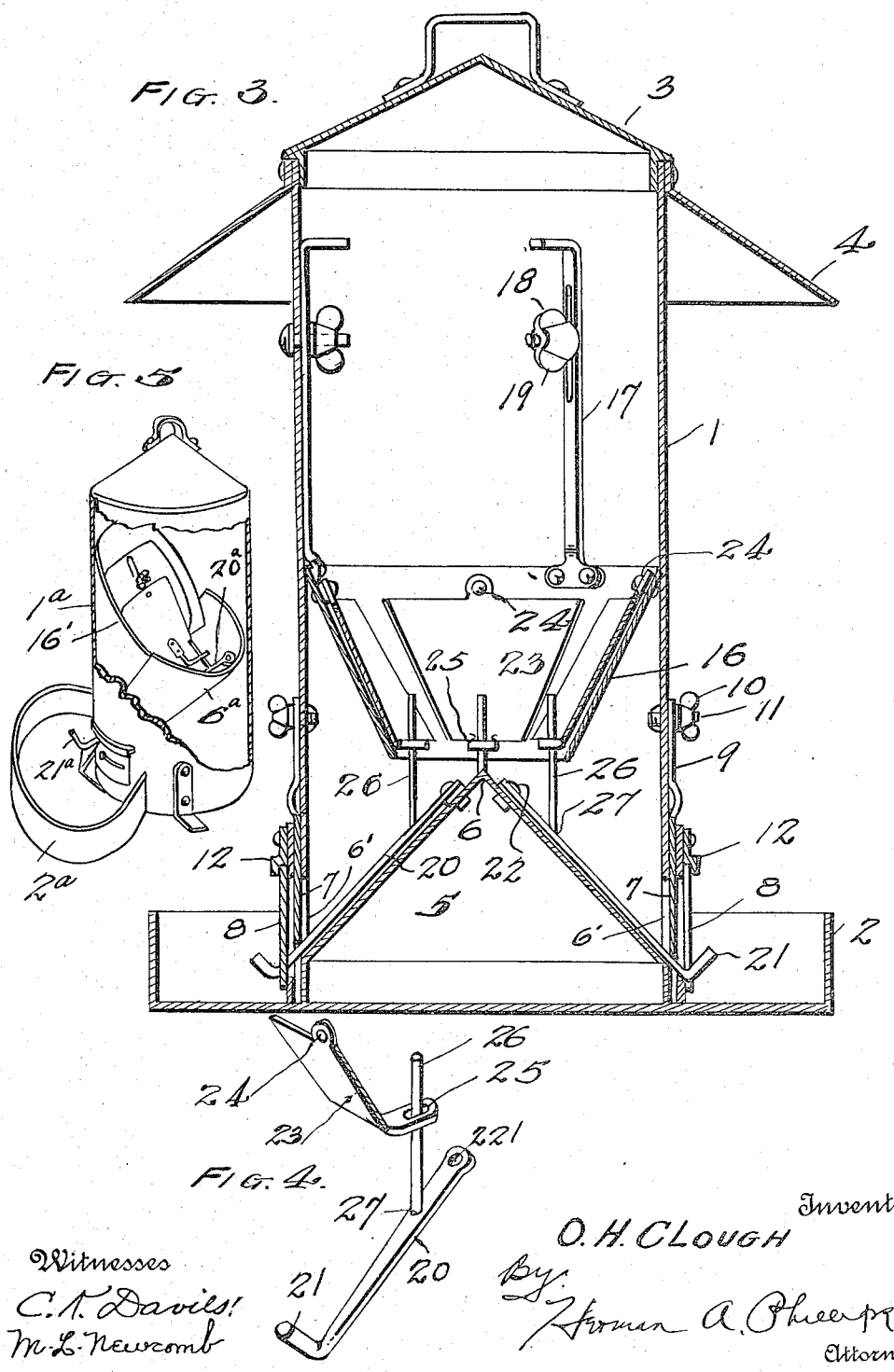

UNITED STATES PATENT OFFICE.

OTIS HALE CLOUGH, OF MECHANICSBURG, OHIO.

ANIMAL-FEEDING DEVICE.

1,167,385. Specification of Letters Patent. Patented Jan. 11, 1916.

Application filed January 18, 1915. Serial No. 2,877.

*To all whom it may concern:*

Be it known that I, OTIS H. CLOUGH, a citizen of the United States of America, residing at Mechanicsburg, in the county of Champaign and State of Ohio, have invented certain new and useful Improvements in Animal-Feeding Devices, of which the following is a specification.

The present invention relates to improvements in animal feeding devices of the hopper and trough type in which the supply is controlled or regulated by the nose of the animal contacting with an actuating part of the device.

The primary object of the invention is the provision of a device of this character which is facile, efficient and economical in operation and which may be produced at a comparatively inexpensive cost.

The invention consists in certain novel combinations and arrangements of parts that are adjustable to different positions in order that the supply of feed may be regulated and fixed for various conditions, as will be more clearly pointed out hereinafter.

In the accompanying drawings I have illustrated one complete example of the physical embodiment of my invention constructed according to the best mode I have so far devised for the practical application of the principles of the invention.

Figure 1 is a side elevation of a feeding device constructed according to my invention. Fig. 2 is a transverse sectional view on line 2—2 of Fig. 1. Fig. 3 is a vertical sectional view of the device showing some parts in section. Fig. 4 is a perspective view of the agitator mechanism or device. Fig. 5 is a perspective view, partly broken away, showing a modification of the invention wherein only one feeding device is employed.

In the preferred embodiment of the invention as illustrated in the drawings the metallic tank or can 1 is provided with an annular trough 2 extending around its bottom end and the outer wall of the trough is spaced a suitable distance from the wall of the tank or can 1. The upper open end of the tank 1 is closed by means of the lid or cover 3, and a hood 4 located just below the top of the tank prevents extraneous matter from dropping into the trough and also provides a protection against the weather.

The bottom of the tank 1 is formed by a conically shaped wall 5 with its apex 6 at the center of the tank, and this wall forms a tapering bottom for the tank that will cause feed to flow toward the outlets or openings 6' located at the base of the side walls of the tank and just above the floor of the trough. In the drawings I have illustrated four of these feed openings, but it will be understood that the number may be increased or decreased as desired to fulfil different conditions or purposes. These openings, or rather the area of each of the openings is controlled or regulated by means of two slides or gates, a vertical slide or gate 7 and a horizontally sliding gate 8. The vertical slide gate 7 is provided with a slotted plate 9 extending from the upper end of the gate and this slotted plate is held in adjusted position by means of a winged nut 10 on a threaded pin or screw 11 fixed in the walls of the tank. It will be evident that when the winged nut is loosened the slotted plate may be moved vertically to desired position so that the vertically slidable gate 7 may be adjusted to cover the area of the opening and thus control the flow of feed through the opening.

The horizontally slidable gate 8 is guided in a grooved bracket 12, and by means of the slot 13, wing nut 14 and screw 15, the latter fixed in the wall of the tank, it will be evident that the area of the opening may be determined also by means of this adjustable slide plate 8. There are four of these pairs of slide gates, and inasmuch as their construction and operation are the same I have designated all the corresponding parts by the same numerals.

The devices just described are adapted to regulate the flow of the feed to the trough and control the outlet of the feed. A further adjustment for the flow of feed is accomplished inside the tank 1. This adjustment is accomplished by means of a hopper 16 which may be moved with relation to the conical bottom 5 of the tank. The hopper is in the form of a truncated cone, inverted, with its open lower end in proximity to the apex 6 and in the drawings I have illustrated it as suspended by means of the slotted brackets 17, three in number, which are adjustably held to the interior wall of the tank by means of the fixed bolts or screws, and the winged nuts indicated by the numbers 18 and 19 respectively. Thus it will be seen that by means of these slotted brackets and bolts and nuts the height of the hopper may be adjusted and the opening in the bottom of the hopper regulated by its proximity to the apex of the conical bottom 5. In this manner the quantity of feed passing through the bottom of the hopper may be regulated and adjusted.

In connection with the conical bottom and tapered hopper I employ agitators or stirrers, one for each regulated opening in the tank, by means of which the animals may stir up or agitate the feed material and assist in its movement to the feed trough. Each of these agitators or stirrers includes an arm 20 having its bent end 21 located in the trough and its other end pivoted at 22 near the apex of the conical bottom so that when an animal pushes against the bent end of the arm it may swing on its pivot. A second arm or plate of sheet metal as 23, is pivoted near the top of the hopper at 24, and the lower free end of this plate is bent and slotted as at 25 to receive a link 26 which is screwed at 27 in the arm 20. Thus when the animal pushes against the bent end of the arm 20 the arm swings on its pivot and the second arm or plate 23, through the connection is also swung on its pivot, so that the feed material is agitated and stirred and caused to flow more freely toward the trough, by the shaker feed.

In the modified form of the invention shown in Fig. 5 the feeding can or tank 1ª is provided with one feeding device only and the trough 2ª is of sufficient size for the one opening. The bent end 21ª of the arm 20ª is used by the animal to agitate the feed and cause it to flow from the hopper 16' over the cone shaped bottom 6ª and out into the trough 2ª.

It will be noted that by opening the horizontally sliding gate, the pivoted arm 20 is given a wider radius in which to swing thus increasing the stroke when the arm is pushed upon by the animal and in this manner the feed may be fed quickly to the outlet.

By means of the three adjustable parts *i. e.* the two sliding gates and the adjustable hopper, the flow of feed may be thoroughly regulated whether for quick running or comparatively slow running feed. The outlet openings are purposely made low so that the trough cannot be more than half filled, and the feed may thus be cut off as soon as the feed in the trough blocks up the openings.

By the utilization of the above devices the hogs or other animals are permitted to feed themselves, not only making a saving in labor, but a saving in feed.

The feeding device is automatic and adjustable for use with various kinds of feeding material, and thus provides for all kinds of grains and feeds.

What I claim is:—

1. The combination with a feed receptacle having a conical shaped bottom and openings in proximity thereto, an annular trough around the lower end of the receptacle, and an inverted truncated hopper with open bottom adjustably suspended within the receptacle, of agitating devices each comprising a pivoted arm with a bent end outside the receptacle, a pivoted plate in the hopper and a connecting link between said arm and said plate.

2. The combination with a feed receptacle having openings therein and a conical bottom and open bottom hopper thereabove, and an annular trough around the lower end of the receptacle, of agitating devices each comprising a pivoted arm with a bent end outside the receptacle, a pivoted plate in the hopper, and a connecting link between said arms and said plate, as described.

In testimony whereof I affix my signature in presence of two witnesses.

OTIS HALE CLOUGH.

Witnesses:
JONATHAN S. NEER,
LEW S. MCCORKLE.

Copies of this patent may be obtained for five cents each, by addressing the "Commissioner of Patents, Washington, D. C."